Patented Aug. 30, 1927.

1,640,800

UNITED STATES PATENT OFFICE.

LESTER C. PETERSON, OF AKRON, OHIO.

LAMINATED RUBBER.

No Drawing.   Application filed January 3, 1927.  Serial No. 158,826.

This invention relates to articles made of rubber, in which it is desired that the material shall have different properties at different points, instead of being homogeneous throughout; and to the process of producing such articles.

As an example of such articles, sheet material such as is used for patching tires and the like may be mentioned, in which sheets it is desired that one side all be composed of cured or vulcanized rubber and the other side of raw or unvulcanized rubber.

Vulcanized rubber is commonly made by mixing or "compounding" the crude rubber with sulphur; a small amount of an organic "accelerator" or a comparatively greater amount of such inorganic materials as litharge, lime, or magnesium oxide which accelerate the vulcanization of the mix by shortening the time or lowering the temperature usually necessary; varying amounts of other pigments added to modify the physical properties of the vulcanizate such as strength, elasticity, hardness, specific gravity and color; and then heating the "compound" until cured or vulcanized.

It has heretofore been attempted to produce rubber articles as above described by uniting sheets or laminations, some of which contain sulphur, sulphides, metallic oxides, or the like and other of which do not, the idea being that the first mentioned sheets will become cured or vulcanized and the last mentioned sheets will remain raw or uncured.

This has not met with any appreciable success, due to the vulcanizing agents, particularly sulphur and accelerators migratory in nature, getting upon and penetrating into the layers which it is desired shall not become vulcanized, and so causing these layers to be vulcanized as well as the other laminations.

I have found that curing of these layers can be prevented by incorporating therein, in the compounding thereof, certain materials which neutralize the effect of the vulcanizing agent. Consequently any of this agent getting on or into the layers which it is desired shall not be cured, produces no effect upon these layers even when they are heated with the other layers in vulcanizing the latter.

I will describe by way of example, articles formed and the process by which they are formed, in producing one particular material suitable for tire patches.

Two rubber compounds are produced, one hereinafter called the face compound, which it is desired to use for the side of the articles which is to remain raw or uncured; and the other, hereinafter referred to as the backing compound, for the side which it is desired shall be cured.

The face compound is compounded of the following materials:

Thin pale crepe _____ 58.0
Barytes _____ 38.0
Rosin oil _____ 3.0
Sodium bisulfate _____ 1.0

100.0

The backing compound is compounded of the following materials:
Thin pale crepe _____ 64.0
Sulphur _____ 1.8
Zinc oxide _____ 10.0
Lithopone _____ 22.6
Diorthotolylthiourea _____ 1.6

100.0

The face compound is rolled or calendered to a thickness of about .017 of an inch and is run from the calender upon a suitable fabric, such as Holland. The backing compound is rolled or calendered to a thickness of about .030 of an inch and superposed while hot upon the face compound, which has been previously placed on the fabric, as above stated.

Next, the exposed surface of the backing compound is starched.

After this, the built-up sheet is put into an air heater and maintained at a temperature of 80° centigrade for between 24 and 36 hours. During this heating, the backing compound becomes vulcanized or cured, part of the sulphur uniting with the rubber while whatever sulphur and accelerator may have penetrated the face compound has its action neutralized by the sodium bisulfate incorporated therein. The action of the sulphur and zinc oxide as vulcanizing agents is aided, and the time of vulcanizing shortened by the presence of the diorthotolylthiourea.

The lithopone, barytes, etc., act merely as fillers.

I find that the sodium bisulfate very satisfactorily prevents the vulcanization of the face compound. Other materials may be used to produce the same results. Apparently, it is only necessary that they be acid or acid salts. Among the materials that I have found satisfactory are small amounts of inorganic acids such as hydrochloric, sulphuric, or phosphoric; small amounts of acid salts of alkali or alkali earth metals; or small amounts of organic acids, such as acetic acid, lactic acid, or tannic acid.

While I have described my invention above with some particularity as applied to the particular compounds set forth, for the manufacturer of one form of tire patches, obviously they may be applied to many other compounds and to the making of many other articles, and I, therefore, do not limit myself to the precise details described but claim as my invention, all embodiments thereof falling within the scope of the appended claims.

What I claim:

1. An article composed of two rubber compounds, one of which, as compounded, contains a vulcanizing agent and a vulcanizing accelerator, and the other of which, as compounded, is free from vulcanizing agents and contains material which neutralizes the effect of such vulcanizing agents.

2. An article made of two layers of rubber, one of which contains a vulcanizing agent and the other of which, as compounded, is free from vulcanizing agents and contains material capable of neutralizing the effect of such agents.

3. The process of producing a rubber article which comprises making two rubber compounds, one of which contains a vulcanizing agent and the other of which is free from vulcanizing agents and contains material neutralizing the effect of said agent, forming an article with parts which it is desired shall be vulcanized of the first mentioned compound, and parts which it is desired shall not be vulcanized of the second mentioned compound, and then heating the entire article until the first mentioned compound is vulcanized.

4. The process of producing rubber sheets having one side only vulcanized, which comprises making two compounds of rubber, one containing the vulcanizing agent and the other being free from vulcanizing agents and containing material neutralizing the effect of said agent, forming said compounds into sheets, superposing said sheets and heating the entire laminated sheet until the first mentioned compound is vulcanized.

5. The process of forming rubber sheets having one side vulcanized and the other side raw, which comprises making two compounds of rubber, one containing the vulcanizing agent and vulcanizing accelerator and the other being free from vulcanizing agents and containing a material which neutralizes the effect of said vulcanizing agent, calendering the second mentioned compound to the thickness of raw rubber desired in the finished product, delivering the same upon a sheet of flexible material, calendering the other compound to the thickness of vulcanized material desired in the finished sheet, superposing said compound upon the first mentioned compound, starching the exposed surface of said last mentioned layer, and then heating the composite sheet until the outer layer has been vulcanized.

6. A process of forming a sheet of rubber, having different characteristics on each side, which comprises providing a plurality of sheets of different rubber compounds, one of said compounds having a vulcanizing agent and a vulcanization accelerator, another of said compounds having no vulcanizing agent and containing a substance to counteract the effect of any vulcanizing agent that may come in contact therewith, superposing said sheets and heating the composite sheet until the first mentioned compound is completely vulcanized.

LESTER C. PETERSON.